United States Patent
Long

(10) Patent No.: US 8,442,131 B2
(45) Date of Patent: May 14, 2013

(54) POWER REDUCTION FOR DIGITAL SUBSCRIBER LINE

(75) Inventor: Guozhu Long, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1016 days.

(21) Appl. No.: 12/353,903

(22) Filed: Jan. 14, 2009

(65) Prior Publication Data

US 2009/0180526 A1 Jul. 16, 2009

Related U.S. Application Data

(60) Provisional application No. 61/020,993, filed on Jan. 14, 2008.

(51) Int. Cl.
*H04K 1/10* (2006.01)

(52) U.S. Cl.
USPC ............................ 375/260; 375/295; 375/316

(58) Field of Classification Search .................. 375/222, 375/229, 260, 261, 295, 146; 370/206, 207
See application file for complete search history.

(56) References Cited

U.S. PATENT DOCUMENTS

| | | | | |
|---|---|---|---|---|
| 5,479,447 A * | 12/1995 | Chow et al. | ................... | 375/260 |
| 6,219,378 B1 * | 4/2001 | Wu | ............... | 375/231 |
| 6,389,062 B1 * | 5/2002 | Wu | ............... | 375/222 |
| 6,628,754 B1 * | 9/2003 | Murphy et al. | ............. | 379/1.03 |
| 7,110,467 B2 * | 9/2006 | Mitlin et al. | ................. | 375/295 |
| 7,177,350 B1 * | 2/2007 | Long et al. | .................... | 375/222 |
| 7,280,603 B2 * | 10/2007 | Jeong et al. | .................... | 375/260 |
| 7,352,820 B2 * | 4/2008 | Redfern | ....................... | 375/260 |
| 7,403,569 B2 * | 7/2008 | Redfern | ....................... | 375/260 |
| 7,486,608 B1 * | 2/2009 | Long et al. | .................... | 370/207 |
| 2003/0031240 A1 * | 2/2003 | Redfern et al. | .............. | 375/222 |
| 2003/0031269 A1 * | 2/2003 | Verbin | ......................... | 375/295 |
| 2003/0086486 A1 * | 5/2003 | Graziano et al. | .............. | 375/222 |
| 2008/0049855 A1 * | 2/2008 | Duvaut et al. | ................. | 375/260 |
| 2008/0310484 A1 * | 12/2008 | Shattil | ......................... | 375/146 |

OTHER PUBLICATIONS

ITU-T, "Series G: Transmission Systems and Media, Digital Systems and Networks, Digital Sections and Digital Line System—Access Networks, Very High Speed Digital Subscriber Line Transceivers 2 (VDSL2)," Telecommunication Standardization Sector of ITU, G.993.2, Feb. 2006, 252 pages.

(Continued)

*Primary Examiner* — Daniel Washburn
*Assistant Examiner* — Fitwi Hailegiorgis
(74) *Attorney, Agent, or Firm* — Conley Rose, P.C.; Grant Rodolph; Clint Wilkins

(57) ABSTRACT

An apparatus comprising a transmitter configured to transmit a low power mode Discrete Multi-Tone (DMT) signal using a plurality of DMT tones, wherein at least some of the DMT tones comprise a low power mode (LPM) tone that carries data at a normal PSD level and a non-LPM tone that is transmitted at a reduced PSD level. Also disclosed is a network component comprising at least one processor configured to implement a method comprising detecting a plurality of signal to noise ratio (SNR) values for a plurality of LPM tone signals and a plurality of non-LPM tone signals, and handling crosstalk interference between lines using the detected SNR values.

15 Claims, 3 Drawing Sheets

OTHER PUBLICATIONS

ITU-T, "Series G: Transmission Systems and Media, Digital Systems and Networks, Digital Sections and Digital Line System—Access Networks, Asymmetric Digital Subscriber Line Transceivers 2 (ADSL2)", Telecommunication Standardization Sector of ITU, G.992.3, Jan. 2005, 436 pages.

ITU-T, "Series G: Transmission Systems and Media, Digital Systems and Networks, Digital Sections and Digital Line System—Access Networks, Asymmetric Digital Subscriber Line (ADSL) Transceivers—Extended Bandwidth ADSL2 (ADSL2plus)", Telecommunication Standardization Sector of ITU, G.992.5, Jan. 2009, 139 pages.

ITU—Telecommunication Standardization Sector, "G.vector: Draft Text for G.vector," Study Group 15, Temporary Document BF-R18, Question 4/15, Bordeaux, France, Dec. 3-8, 2007, 8 pages.

ITU—Telecommunication Standardization Sector, "G.gen: G.vdsl: ADSL: A Proposal for a Stable Low Power Mode," Study Group 15, Temporary Document BF-054, Question 4/15, Bordeaux, France, Dec. 3-7, 2007, 2 pages.

Tellado, Jose, et al., "PAR Reduction in Multicarrier Transmission Systems," Information Systems Laboratory, Feb. 9, 1998, 14 pages.

* cited by examiner

POWER REDUCTION FOR DIGITAL SUBSCRIBER LINE

CROSS-REFERENCE TO RELATED APPLICATIONS

The present application claims priority to U.S. Provisional Patent Application No. 61/020,993 filed Jan. 14, 2008 by Guozhu Long and entitled, "Power Reduction for DSL," which is incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide large bandwidth for digital communications over existing subscriber lines. When transmitting data over the subscriber lines, some DSL technologies, such as Asymmetric DSL (ADSL) or Very high rate DSL (VDSL), use a Discrete Multi-Tone (DMT) line code that allocates a plurality of bits for each sub-carrier or tone in each symbol. The DMT may be adjusted to various channel conditions that may occur at each end of a subscriber line. In such technologies, typically three power management states may be defined, such as in the Telecommunication Standardization Sector (ITU-T) G.992.3/5 and G.993.2 specifications for ADSL2 and VDSL2, respectively, all of which are incorporated herein by reference. The three power management states comprise a mode 0 (L0) state for normal operation mode, a mode 2 (L2) state for idle mode, and a mode 3 (L3) state for off mode.

Statistically, the DSL link is idle most of time. L2 state is designed in G.992.3/5 such that the transceivers can take advantage of that factor to reduce the power consumption by reducing the transmitted signal level. To reduce the power consumption, the DSL transceiver should be maintained more frequently in the L2 state rater than the L0 state at a relatively low-speed connection, which reduces the transmission power spectrum density (PSD) at the corresponding line. Reducing the transmission PSD reduces the power consumption of the line driver, which comprises a relatively large portion of the total power consumption in the system. Additionally, reducing the transmission PSD reduces the crosstalk interference between transmitted signals over adjacent twisted-pair phone lines in a same or nearby bundle of lines. When the DSL devices on a subscriber line detect a reduction in crosstalk interference, the DSL devices may adjust their operations, for instance by increasing their data rate or reducing their transmission PSD. However, when the line in L2 state returns to L0 state, its transmission PSD is increased to the normal level, thus the crosstalk to the neighboring lines increases. Since those lines may have adjusted their operation based on the reduced crosstalk level, they may not operate properly under the increased crosstalk level, causing network instability. Therefore, a better low power mode is needed which does not cause network instability.

SUMMARY

In one embodiment, the disclosure includes an apparatus comprising a transmitter configured to transmit a low power mode DMT signal using a plurality of DMT tones, wherein at least some of the DMT tones comprise a low power mode (LPM) tone that carries data at a normal PSD level and a non-LPM tone that is transmitted at a reduced PSD level.

In another embodiment, the disclosure includes a network component comprising at least one processor configured to implement a method comprising detecting a plurality of signal to noise ratio (SNR) values for a plurality of LPM tone signals and a plurality of non-LPM tone signals, estimating SNR values at the non-LPM tones through interpolation using measured SNR values at LPM tones, and comparing the interpolated SNR and the measure SNR at non-LPM tones and determine the appropriate SNR values to use.

In yet another embodiment, the disclosure includes a method comprising transmitting an initial training signal comprising a plurality of LPM tones at the normal PSD levels and a plurality of non-LPM tones, wherein some non-LPM tones are transmitted at the normal PSD level to allow neighboring lines to measure crosstalk changes.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A DSL receiver coupled to a subscriber line may detect the SNR values for at least some of the tones. The detected SNR values may be used to determine the quantity of transmitted bits or bit-loading over the tones. Disclosed herein are systems and methods for determining the appropriate SNR values for a plurality of DSL tones to ensure stable operation at the desired data rates. The DSL tones may comprise LPM tones, which may be used to transmit the signals at about the same power level of a normal operation mode, and non-LPM tones, which may be used to transmit signals typically at lower power levels. At the neighboring lines, the crosstalk at the non-LPM tones is reduced in LPM mode, but may come back to the normal level when the LPM mode ends. To maintain stability, those lines do not adjust their rates based on the reduced crosstalk level. Instead, the SNR values over the LPM tones may be measured and used to interpolate the estimated SNR values over the non-LPM tones. However, in some noise conditions, such as narrow-band interferences, the interpolated SNR may be higher than the actual noise level. Hence, both the measured SNR and interpolated SNR values at the non-LPM tones may be used to reduce determine an appropriate SNR level. Typically, the smaller of the two may be used.

Figure 1:
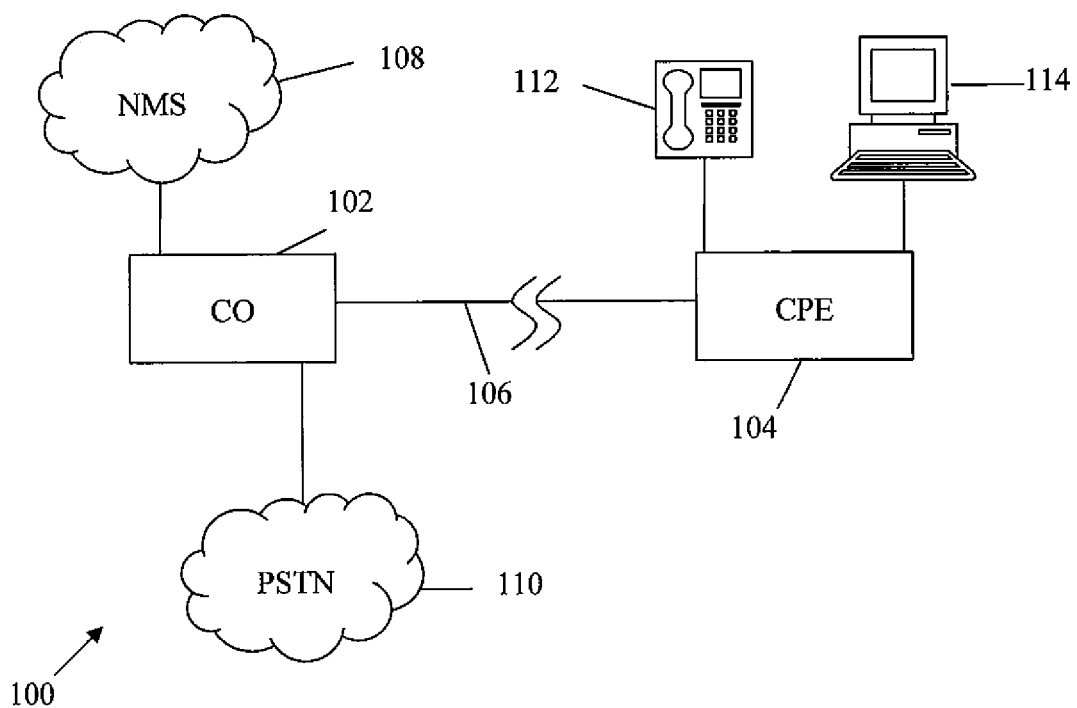
FIG. 1 is a schematic diagram of an embodiment of a DSL system.

FIG. 1 illustrates one embodiment of a DSL system 100. The DSL system 100 may be a VDSL2 system, an ADSL2 system, or any other DSL system. The DSL system 100 may comprise a central office (CO) 102 and a customer premises equipment (CPE) 104, which may be coupled to the CO 102 via a subscriber line 106. Additionally, the DSL system 100 may comprise a network management system (NMS) 108 and a public switched telephone network (PSTN) 110, which may be coupled to the CO 102, and a telephone 112 and a computer 114, which may be coupled to the CPE 104. In other embodiments, the DSL system 100 may be modified to include splitters, filters, management entities, and various other hardware, software, and functionality.

In an embodiment, the CO 102 may comprise a splitter, which may couple the subscriber line 106 and the PSTN 110. Additionally, the CO 102 may comprise a DSL transmitter/receiver (transceiver), which may couple the splitter or the subscriber line 106 to the NMS 108. For instance, the splitter may be a 2:1 coupler that transmits data signals received from the subscriber line 106 to the NMS 108, via the DSL transceiver, and to the PSTN 110, and transmits data signals received from the NMS 108, via the DSL transceiver, and from the PSTN 110 to the subscriber line 106. Further, the splitter may optionally comprise one or more filters to help direct data signals between the NMS 108, the PSTN 110, and the subscriber line 106. The DSL transceiver may comprise a combination transceiver, such as a modem, which transmits signals to and receives signals from the splitter. The DSL transceiver may process the received signals or may simply pass the received signals to the NMS 108. In an embodiment, the DSL transceiver may comprise a forward error correction (FEC) codeword generator that generates FEC data, an interleaver that interleaves the transmitted data across a plurality of DMT tones, or both.

The CPE 104 may also comprise a splitter, which may couple the subscriber line 106 and the telephone 112, and a DSL transceiver, which may couple the splitter or the subscriber line 106 and the computer 114. The splitter may be a 2:1 coupler that transmits data signals received from the subscriber line 106 to the telephone 112 and the DSL transceiver, and transmits data signals received from the telephone 112 and the DSL transceiver to the subscriber line 106. The splitter may optionally comprise one or more filters to help direct data signals to and from the telephone 112 and the DSL transceiver. The DSL transceiver, which may be a modem, may be a transceiver that transmits signals to and receives signals from the splitter. The DSL transceiver may process the received signals to obtain the transmitted data from the CO 102, and pass the received data to the telephone 112, the computer 114, or both, which may access the NMS 108, the PSTN 110, or other coupled networks, via the DSL connection between the CO 102 and the CPE 104.

In an embodiment, the subscriber line 106 may be a telecommunications path between the CO 102 and the CPE 104, and may comprise one or more twisted-pairs of copper cable. The NMS 108 may be a network management infrastructure that processes data exchanged with the CO 102 via the DSL transceiver, and may be coupled to one or more broadband networks, such as the Internet. The PSTN 10 may be a network that generates, processes, and receives voice or other voice-band signals. The telephone 112 may be hardware, software, or both that generates, processes, and receives voice or other voice-band signals.

The signals may be transmitted between the CO 102 and the CPE 104 via the subscriber line 106 using a DMT line code. As such, DSL data may be divided over a plurality of parallel data streams of channels, where each channel may be transmitted using one of a plurality of tones or symbols. Further, each tone in a symbol may be modulated using an appropriate modulation scheme, such as quadrature amplitude modulation (QAM), at a low symbol rate. The sum of data rates for all the modulated tones may be similar or about equal to a single-carrier modulation scheme in the same bandwidth. Channel equalization for the relatively slowly modulated individual tones or symbols may be simpler in comparison to channel equalization of the relatively faster modulated single-carrier. A simpler channel equalization scheme may be beneficial for reducing at least some transmission problems, such as attenuation of high frequencies in a long copper wire, narrow-band interference, and so forth. Additionally, modulating the individual tones or symbols at low symbol rates may facilitate using guard intervals between tones to reduce or eliminate inter-symbol interference (ISI). The individual tones may be received and then combined to obtain the DSL data.

In an embodiment, DSL data may be transmitted using some of the tones instead of all the tones in a low power mode, such as L2 state, to reduce the power consumption of the line driver and hence the power consumption of the system. The tones that may be used to transmit the DSL data are referred to herein as LPM tones and the remaining tones are referred to as non-LPM tones. For instance, the LPM tones may comprise every subsequent tone after an equal integer number of non-LPM tones. The LPM tones may be substantially similar to the subset of tones used for transmitting the DSL data as described in U.S. Non-Provisional Application No. 12/276,564 (the '564 application) filed Nov. 24, 2008 by Guozhu Long, which is incorporated by reference herein as if reproduced in its entirety, and thus the techniques described herein may be used as an alternative or in conjunction with the techniques described in the '564 application). Accordingly, the LPM tones may be used to transmit signals, which may comprise the DSL data, at about the same power levels of a normal operation mode, such as L0 state. In some embodiments, the data streams may be transmitted as described in contribution BF-054 by Aware to the ITU-T SG15 Q4 meeting in Bordeaux, France, Dec. 3-7, 2007, and entitled "A Proposal for a Stable Low Power Mode," which is also incorporated herein by reference as if reproduced in its entirety. Accordingly, the parallel data streams may be transmitted using every Nth tone from a plurality of tones, where N is a chosen integer. For instance, when N is increased, fewer tones that are further separated apart may be used with more power reduction while the signal quality computation through interpolation may become less accurate. Alternatively, when N is decreased, more tones that are less separated apart may be used with less power reduction, but the signal quality computation through interpolation may become more accurate. Each used tone may be transmitted at about the same power level as a full power mode, hence achieving power savings equal to about $(1-1/N)$ percent.

In previous references, the non-LPM tones are not transmitted in LPM mode to reduce the total transmitted power. However, the channel conditions may change during the LPM mode and the receiver may not track the changes properly due to the lack of signal at the non-LPM tones. In another embodiment of the present invention, at least part of the non-LPM tones may transmit signals at lower or reduced power levels. As a result, the total power for transmissions over all the tones may be still reduced significantly. Alternatively, the non-LPM tones may not transmit simultaneously. Instead, they are transmitted in turns and only a part of the non-LPM tones are transmitted at a time. The transmitted signals over the non-LPM tones and the LPM tones may be used for the receiver to track channel condition changes at those tones so that the receiver is in a good condition when switching back from LPM mode to normal operation. In some embodiments, the signals transmitted using both the LPM tones and non-LPM tones may comprise at least some special DMT symbols, such as a synchronization (sync) symbol, which may be used by the receiver to track the channel condition.

To suppress increases in crosstalk interference when the LPM modem goes back to normal operation, the DSL devices, e.g., modems or transceivers, may determine bit-loading, bit-swapping, or bit redistribution over the DSL tones based on a plurality of estimated SNR values. Such SNR values may be detected for at least some of the LPM tones and non-LPM tones. For instance, the SNR values of the LPM tones only may be measured at the receiver and the SNR values of the non-LPM tones may be estimated or interpolated using the measured SNR values of the LPM tones.

Typically, the interpolated SNR values of the non-LPM tones may be less than the actual corresponding SNR values. Accordingly, the interpolated SNR values may result in less aggressive bit-loading to allow crosstalk increase in the future for increase robustness. However, in some cases, such as narrow-band radio frequency interference (RFI), the interpolated SNR values may be greater tan the actual corresponding SNR values. Using the interpolated SNR values may result in excessive bit-loading, which may cause errors in the transmitted data. In one embodiment, the SNR values of the non-LPM tones may also be measured in addition to the SNR values of the LPM tones. The measured values and the interpolated values of the non-LPM tones may then be compared, and the smaller values between the two may be used to determine bit-loading. The measured SNR values of the non-LPM values may also be used to monitor the channel noise conditions at the corresponding tones.

Figure 2:
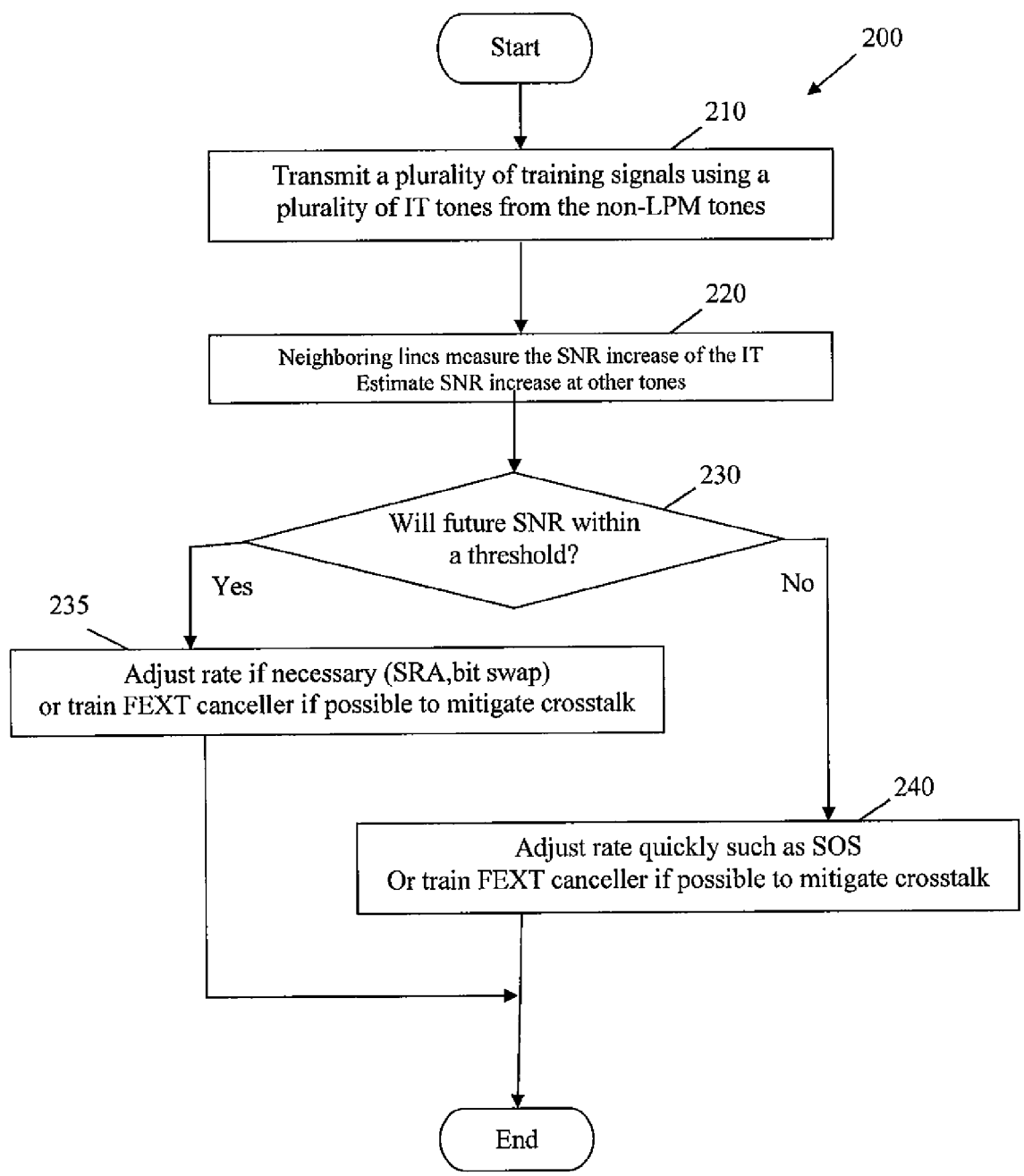
FIG. 2 is a flowchart of an embodiment of a crosstalk interference mitigation method.

FIG. 2 illustrates one embodiment of a new line activation method 200, which may be used to activate a new DSL line or reactivating an existing, dormant DSL line. When a new subscriber line is activated for service (or a dormant line reactivated), the new line may be initially used to transmit training signals before the data signals. The training signals may be used to determine channel conditions and may result in additional crosstalk to neighboring lines. Such sudden crosstalk interference increase may be handled by using the procedures such as emergency rate adjustment (SOS) defined in G.993.2.

At block 210, the new line activation method 200 may transmit a plurality of training signals using a plurality of initial training (IT) tones, which may include a subset of the non-LPM tones over the newly activated line. In an embodiment, the IT tones may comprise every subsequent tone after an equal integer number of the remaining non-LPM tones.

At block 220, the new line activation method 200 may measure the SNR values or noise levels of the IT tones, for instance at the receivers coupled to the neighboring DSL lines. Since statistically many lines in the cable may be in low power mode, the receiver may have big SNR margin at non-LPM tones, thus may tolerate some crosstalk increase. The SNR increase at those non-LPM tones due to the activation of the new line transmitting initial training signals may be estimated and used by the neighboring transceivers to take appropriate actions, such as SOS.

At block 235, the new line activation method 200 may be used to estimate the crosstalk interference from the new line. First, the crosstalk interference from the new line may be evaluated. For instance, the increase in the SNR values of the IT tones may be calculated using the measured SNR values of the IT tones before and after activating the new line and transmitting the training signals. The increase in the SNR values of the IT tones may result from the crosstalk interference from the new line and may be about equal to or proportional to an increase in the SNR values of the LPM tones, which may occur when transmitting data signals or other training signals over the new line. The expected increased SNR values of the LPM tones may be considered to determine the appropriate action.

For instance, if the expected increased SNR values are smaller than a threshold or tolerated due to limited crosstalk interference from the new line, no mitigation may be necessary. Alternatively, the crosstalk interference or the increased SNR values of all the tones, including LPM tones and non-LPM tones, may be calculated or interpolated based on the crosstalk interference from the new line. Such SNR values may then be used to handle the crosstalk introduced from the new line. For example, the estimated SNR degradation may be used to set up SOS for a quick rate reduction to maintain reliable connection; or adjusting a far-end crosstalk (FEXT) canceller or pre-coder coupled to the lines before transmitting the data signals over the new line. If the expected increased SNR values are smaller than a threshold, the corresponding crosstalk interference may be handled using an on-line reconfiguration (OLR) method such as bit swap and seamless rate adjustment. However, if the expected increased SNR values are greater than a threshold due to significant crosstalk interference from the new line, the corresponding crosstalk interference may be handled using methods for emergency rate reduction, such as an SOS method.

In an alternative new line activation method, the training signals may be transmitted using a plurality of IT tones, which may be a subset of the LPM tones instead of the non-LPM tones. The SNR values of the IT tones may be higher than SNR values of the those tones before new line activation, which may indicate that the training signals are being transmitted over the new line. When the difference between the SNR values of the IT tones and the LPM tones are relatively small or within the SNR margin, the crosstalk interference from the new line may be tolerated by the receiver. The FEXT canceller may be trained afterwards to improve SNR or using the OLR method. However, if the difference between the SNR values is greater than the SNR margin or a threshold, the SOS method may be used.

Figure 3:
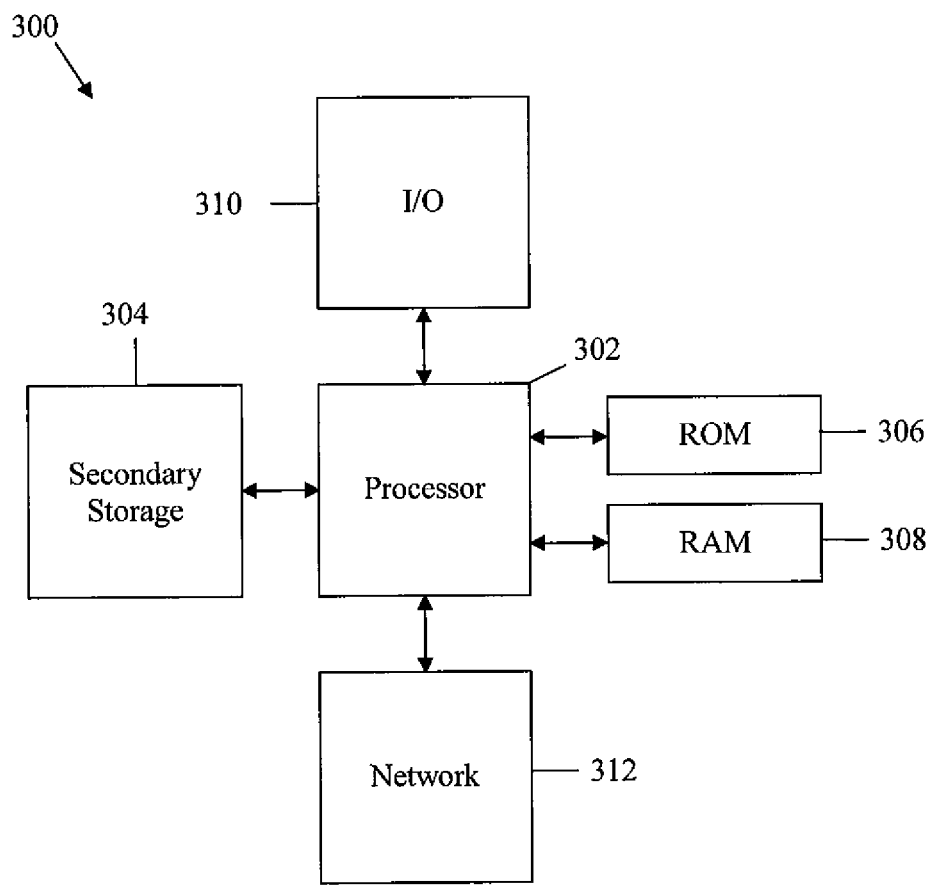
FIG. 3 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 3 illustrates a typical, general-purpose network component 300 suitable for implementing one or more embodiments of the components disclosed herein. The network component 300 includes a processor 302 (which may be referred to as a central processor unit or CPU) that is in communication with memory devices including secondary storage 304, read only memory (ROM) 306, random access memory (RAM) 308, input/output (I/O) devices 310, and network connectivity devices 312. The processor 302 may be implemented as one or more CPU chips, or may be part of one or more application specific integrated circuits (ASICs).

The secondary storage 304 is typically comprised of one or more disk drives or erasable programmable ROM (EPROM) and is used for non-volatile storage of data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage 304. The RAM 308 is used to store volatile data and perhaps to store instructions. Access to both ROM 306 and RAM 308 is typically faster than to secondary storage 304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a transmitter configured to transmit low power mode Discrete Multi-Tone (DMT) symbols using a plurality of low power mode (LPM) tones that carry data at a normal power spectrum density (PSD) level and a plurality of non-LPM tones that are transmitted at a reduced PSD level,
wherein bit-loading is based on:
signal to noise ratio (SKR) measurements at LPM and non-LPM tones;
estimates of SNR values at the non-LPM tones through interpolation using measured SNR values at LPM tones; and
comparisons of the interpolated SNR and measured SNR at non-LPM tones.

2. The apparatus of claim 1, wherein every subsequent DMT tone after an equal integer number of non-LPM tones is an LPM tone.

3. The apparatus of claim 1, wherein at least some of the DMT tones comprise a plurality of non-LPM tones that are not simultaneously transmitted.

4. A network component comprising:
at least one processor configured to:
measure a plurality of signal to noise ratio (SNR) values for a plurality of low power mode (LPM) tones and a plurality of non-LPM tones, wherein the LPM tones and non-LPM tones are transmitted in a low power mode;
estimate SNR values at the non-LPM tones through interpolation using measured SNR values at LPM tones; and
compare the interpolated SNR and the measured SNR at non-LPM tones and determine the appropriate SNR values to use, 5. The network component of claim 4, wherein the at least one processor is further configured to:
measure the SNR values of all the tones;
interpolate the measured SNR values at the LPM tones to obtain interpolated SNR at non-LPM tones; and
determine the SNR value at each non-LPM tone using the smaller of the measured SNR value and the interpolated SNR value at that tone.

6. The network component of claim 4, wherein the transmitted signal at he non-LPM tones are used to monitor and track channel condition changes.

7. The network component of claim 4, wherein the at least one processor is further configured to:
transmit a plurality of training symbols using a plurality of initial training (IT) tones by a newly activating line;
measure the SNR values of the IT tones by a neighboring line; and
determine action to handle additional crosstalk caused by the newly activating line.

8. The network component of claim 7, wherein the IT tones are a subset of the non-LPM tones.

9. The network component of claim 7, wherein the IT tones are a subset of the LPM tones, 10. The network component of claim 7, wherein the SNR margins allow adjustment a far-end crosstalk (FEXT) canceller, a pre-coder, or a modem to handle the new line crosstalk.

11. The network component of claim 7, wherein an on-line reconfiguration (OLR) method is used to mitigate the crosstalk interference from the newly activated line when the SNR values increase.

12. The network component of claim 7, wherein an emergency rate adjustment (SOS) method is used to mitigate the crosstalk interference from the newly activated line when the SNR values increase suddenly.

13. A method comprising:
receiving an initial training symbol comprising a plurality of low power mode (LPM) tones at a normal power spectrum density (PSD) level and a plurality of non-LPM tones at a reduced PSD level;

measuring a plurality of signal to noise ratio (SNR) values for the plurality of LPM tones and the plurality of non-LPM tones;

estimating SNR values at the non-LPM tones through interpolation using measured SNR values at LPM tones; and comparing the interpolated SNR and the measured SNR at non-LPM tones and determine the appropriate SNR values to use.

14. The method of claim 13, wherein the initial training symbols are Asymmetric DSL (ADSL) transmission symbols or Very high rate DSL (VDSL) transmission symbols.

15. The method of claim 13, wherein every subsequent tone after an equal integer number of non-LPM tones is an LPM tone.

* * * * *

UNITED STATES PATENT AND TRADEMARK OFFICE
CERTIFICATE OF CORRECTION

PATENT NO.       : 8,442,131 B2
APPLICATION NO.  : 12/353903
DATED            : May 14, 2013
INVENTOR(S)      : Guozhu Long It is certified that error appears in the above-identified patent and that said Letters Patent is hereby corrected as shown below:

In the Claims

Column 7, line 64 - Column 8, line 11, printed claim 1 should read as:
1. An apparatus comprising:
a transmitter configured to transmit low power mode Discrete Multi-Tone (DMT) symbols using a plurality of low power mode (LPM) tones that carry data at a normal power spectrum density (PSD) level and a plurality of non-LPM tones that are transmitted at a reduced PSD level,
wherein bit-loading is based on:
signal to noise ratio (SNR) measurements at LPM and non-LPM tones;
estimates of SNR values at the non-LPM tones through interpolation using measured SNR values at LPM tones; and
comparisons of the interpolated SNR and measured SNR at non-LPM tones.

Column 8, lines 54-56, printed claim 10, should read as:
10. The network component of claim 7, wherein the SNR margins allow adjustment a far-end crosstalk (FEXT) canceller, a pre-coder, or a modem to handle the new line crosstalk.

Signed and Sealed this
Sixteenth Day of July, 2013

Teresa Stanek Rea
*Acting Director of the United States Patent and Trademark Office*